United States Patent [19]

Tamezawa et al.

[11] Patent Number: 4,785,937
[45] Date of Patent: Nov. 22, 1988

[54] RETORTABLE POUCH AND PACKAGING MATERIAL FOR THE RETORTABLE POUCH

[75] Inventors: Tadao Tamezawa, Chiba; Yoshiji Moteki, Kitaadachi, both of Japan

[73] Assignee: Kabushiki Kaisha Hosokawa Yoko, Japan

[21] Appl. No.: 34,713

[22] Filed: Apr. 6, 1987

[30] Foreign Application Priority Data

Apr. 7, 1986 [JP] Japan .............................. 61-51583[U]

[51] Int. Cl.⁴ ............................................ B65D 65/90
[52] U.S. Cl. ..................... 206/484; 206/632; 229/3.5 MF; 383/111; 426/126; 428/40; 428/461; 428/35.3
[58] Field of Search ..................... 206/484, 632, 524.1, 206/813; 229/3.5 MF, 48 R, 48 T; 426/126, 127, 412, 415; 428/35, 461, 40, 36, 335, 349, 516; 383/100, 103, 109, 113, 111

[56] References Cited

U.S. PATENT DOCUMENTS

| | | | |
|---|---|---|---|
| 3,502,541 | 3/1970 | Herwible et al. | 426/126 X |
| 3,509,991 | 5/1970 | Hurst | 206/813 X |
| 3,556,816 | 1/1971 | Nughes | 426/126 |
| 3,663,240 | 5/1972 | Seiferth et al. | 229/48 T |
| 4,009,312 | 2/1977 | Hayashi et al. | 426/126 X |
| 4,058,632 | 11/1977 | Evans et al. | 426/126 |
| 4,085,244 | 4/1978 | Stillman | 428/35 X |
| 4,190,477 | 2/1980 | Ossian et al. | 426/126 X |
| 4,291,085 | 9/1981 | Ito et al. | 426/126 X |
| 4,308,084 | 12/1981 | Ohtusuki et al. | 206/524.1 X |
| 4,310,578 | 1/1982 | Katsura et al. | 428/35 |
| 4,311,742 | 1/1982 | Otsuka | 428/35 |
| 4,424,256 | 1/1984 | Christensen et al. | 428/35 X |
| 4,550,546 | 11/1985 | Raley et al. | 383/103 X |
| 4,623,587 | 11/1986 | Ho et al. | 428/335 |
| 4,654,255 | 3/1987 | Kojima et al. | 426/127 X |

FOREIGN PATENT DOCUMENTS 1536428 12/1978 United Kingdom ............... 206/632

*Primary Examiner*—Stephen Marcus
*Assistant Examiner*—Bryon Gehman
*Attorney, Agent, or Firm*—Parkhurst, Oliff & Berridge

[57] ABSTRACT

A packaging material for a retortable pouch comprises a laminated base film formed by laminating together a polyester film and an inelastic polypropylene film, a laminated cover film formed by laminating together a polyester film and an aluminum foil, and an adhesive layer detachably bonding the polyester film of the laminated base film to the aluminum foil of the laminated cover film, thereby laminately bonding the laminated cover film to the laminated base film. When the retortable pouch is heated in a microwave oven, the laminated cover film having the aluminum foil is removed from the laminated base film, whereby microwaves generated by a magnetron are not intercepted, and cooked food packaged in the retortable pouch can be heated adequately.

6 Claims, 1 Drawing Sheet

RETORTABLE POUCH AND PACKAGING MATERIAL FOR THE RETORTABLE POUCH

BACKGROUND OF THE INVENTION

The present invention relates to a retortable pouch and a packaging material for the retortable pouch in which cooked food is sealed and preserved.

In general, a retortable pouch is required to be made of a material impermeable to gas in order to ensure good preservation of cooked food packaged therein. Accordingly, a laminated film consisting of a polyester film, an aluminum foil and an inelastic polypropylene is generally used as a retortable pouch.

When cooked food packaged in a retortable pouch made of the above laminated film is heated in boiling water, it requires a long time to restore the food to its original condition. Therefore, a new method in which cooked food packaged in the retortable pouch is heated by the use of a microwave oven in a few minutes has been proposed. However, since microwaves generated by a magnetron are intercepted by the aluminum foil of the laminated film, cooked food packaged in the retortable pouch cannot be heated adequately.

Furthermore, sparks are generated at some parts of the retortable pouch which are irradiated by the microwaves.

That is, when the retortable pouch made of the above laminated film is used for packaging cooked food, the cooked food packaged therein cannot be heated adequately by a microwave oven.

SUMMARY OF THE INVENTION

It is an object of this invention to provide a retortable pouch and a packaging material for a retortable pouch capable of being heated by a microwave oven without impairing good preservation of cooked food packaged therein.

According to one aspect of this invention there is provided a packaging material for a retortable pouch comprising: a laminated base film formed by laminating together a polyester film and an inelastic polypropylene film; a laminated cover film formed by laminating together a polyester film and an aluminum foil; and an adhesive layer detachably bonding the polyester film of the laminated base film to the aluminum foil of the laminated cover film, thereby laminately joining the laminated base film and the laminated cover film, the bonding strength of said adhesive layer being lower than that of bonding together the polyester film and the aluminum foil of the laminated cover film.

According to another aspect of this invention, there is provided a retortable pouch for accommodating cooked food therein, which forms a bag sealed at its periphery, the bag being made of sheet-like packaging material, the packaging material comprising: a laminated base film formed by laminating together a polyester film and an inelastic polypropylene film; a laminated cover film formed by laminating together a polyester film and an aluminum foil; and an adhesive layer detachably bonding the polyester film of the laminated base film to the aluminum foil of the laminated cover film, thereby laminately joining the laminated base film and the laminated cover film, the bonding strength of said adhesive layer being lower than the adhesive layer bonding together the polyester film and the aluminum foil of the laminated cover film.

The nature, utility, and further features of this invention will be more clearly apparent from the following detailed description with respect to a preferred embodiment of the invention when read in conjunction with the accompanying drawing, briefly described below.

DETAILED DESCRIPTION OF THE INVENTION

Figure 1:
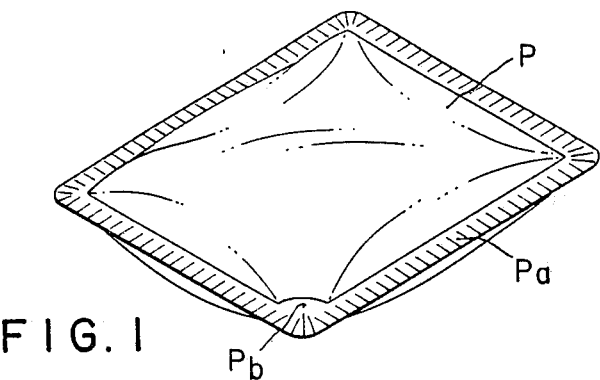
FIG. 1 is a perspective view of a retortable pouch.
Figure 2:
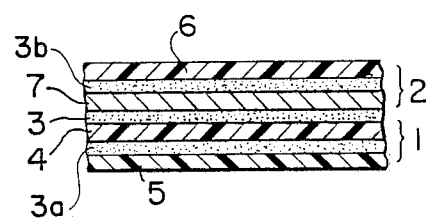
FIG. 2 is a cross-sectional view showing an embodiment of the packaging material for a retortable pouch.

In FIG. 1, a retortable pouch P accommodates cooked food therein. The retortable pouch P is in the form of a bag made of sheet-like packaging material with its sealed periphery Pa. At one of the corners of the pouch P is provided a peeling portion Pb whose function is explained thereafter. A packaging material for the retortable pouch P comprises a laminated base film 1, a laminated cover film 2 and an adhesive layer 3 for bonding together the laminated base film 1 and the laminated cover film 2.

The laminated base film 1 is formed by laminating a polyester film 4 with a thickness of twelve microns and inelastic polypropylene film 5 with a thickness of sixty microns with an adhesive layer 3a therebetween. The laminated cover film 2 is formed by bonding a polyester film 6 with a thickness of twelve microns and an aluminum foil 7 with a thickness of twenty microns with an adhesive layer 3b therebetween.

The laminated base film 1 and the laminated cover film 2 are bonded together in such a manner that the polyester film 4 and the aluminum foil 7 opposed to each other are bonded together via an adhesive layer 3 made of polypropylene modified with acid or polyester.

The bonding strength of the adhesive layer 3 is lower than the bonding strength of the adhesive layer in the laminated cover film 2, but is made high enough to withstand pasteurization process and transportation to which the retortable pouch P with cooked food sealed therein is subjected.

Figure 4:
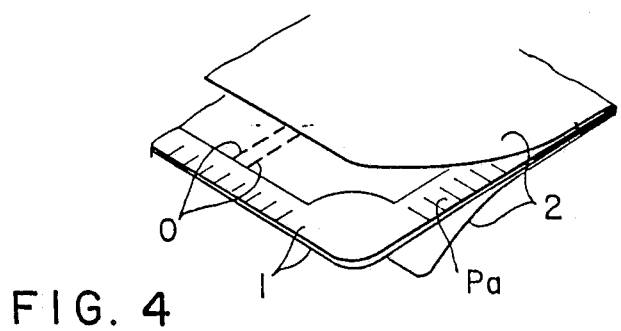
FIG. 4 is a partial view of the pouch, showing a state wherein a series of openings are formed on the laminated base film of the pouch.

The laminated base film 1 may be provided with a plurality of openings 0,0 . . . 0 of a suitable small diameter which will prevent the retortable pouch P from being inflated by vapour generated from the cooked food contained in the retortable pouch P when the pouch P is heated (FIG. 4).

Figure 3:
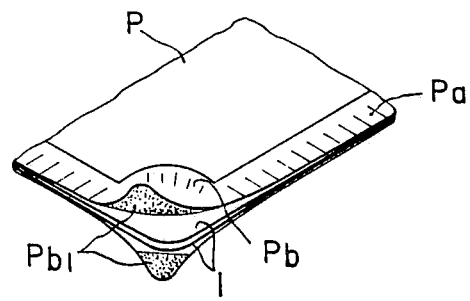
FIG. 3 is a perspective view of the retortable pouch, showing a state wherein the laminated cover film thereof is removed from the laminated base film thereof.

In this embodiment of the invention, when the retortable pouch P is heated in a microwave oven, the front and back laminated cover films 2 each containing an aluminum foil 7 are removed from the front and back laminated base films 1 as shown in FIG. 3, respectively. That is, parting agent such as silicon is applied to the back surfaces Pb1 of the peeling portions Pb of the cover films 2 so that a user can remove the cover films 2 with the peeling portions picked up by his fingers. Therefore, microwaves generated by a magnetron are not intercepted by each aluminum foil 7 and cooked food packaged in the retortable pouch P can be heated adequately. Furthermore, sparks are not generated at some parts of the retortable pouch P which are irradiated by the microwaves. If vapour is generated, it is discharged from the openings 0 in the base films 1.

Consequently, according to this invention, since the laminated base film 1 and the laminated cover film 2 are bonded in a state wherein they are capable of separating from each other, the strength of the retortable pouch P is made high enough to withstand pasteurization process to which the retortable pouch P with cooked food sealed therein is subjected, and sparks are not generated at some parts of the retortable pouch P which are irradiated by the microwaves.

What is claimed is:

1. A packaging material for a retortable pouch comprising:
   (a) a laminated base film formed by laminating together a polyester film and an inelastic polypropylene film with a first adhesive layer;
   (b) a laminated cover film formed by laminating together a polyester film and an aluminum foil with a second adhesive layer;
   (c) a third adhesive layer detachably bonding the polyester film of the laminated base film to the aluminum foil of the laminated cover film, thereby bonding together the laminated base film and the laminated cover film, the bonding strength of said third adhesive layer being lower than the adhesive layer bonding together the polyester film and the aluminum foil of the laminated cover film.

2. A packaging material according to claim 1, wherein the polyester film and the inelastic polypropylene film of the laminated base film have twelve and sixty micron thicknesses, respectively, and the polyester film and the aluminum foil of the laminated cover film have twelve and twenty micron thicknesses, respectively.

3. A retortable pouch for accommodating cooked food therein, which forms a bag sealed at its periphery, the bag being made of sheet-like packaging material, the packaging material comprising:
   (a) a laminated base film formed by laminating together a polyester film and an inelastic polypropylene film with a first adhesive layer;
   (b) a laminated cover film formed by laminating together a polyester film and an aluminum foil with a second adhesive layer;
   (c) a third adhesive layer detachably bonding the polyester film of the laminated base film to the aluminum foil of the laminated cover film, thereby bonding together the laminated base film and the laminated cover film, the bonding strength of said third adhesive layer being lower than the adhesive layer bonding together the polyester film and the aluminum foil of the laminated cover film.

4. A packaging material according to claim 5, wherein a plurality of openings are formed in the laminated base film in order to discharge vapour generated from cooked food in a pouch.

5. A packaging material for a retortable pouch comprising:
   (a) a laminated base film formed by laminating together a polyester film and an inelastic polypropylene film with a first adhesive layer;
   (b) a laminated cover film formed by laminating together a polyester film and an aluminum foil with a second adhesive layer;
   (c) a third adhesvie layer detachably bonding the polyester film of the laminated base film to the aluminum foil of the laminated cover film, thereby bonding together the laminated base film and the laminated cover film, the bonding strength of said third adhesive layer being lower than the adhesive layer bonding together the polyester film and the aluminum foil of the laminated cover film; and
   (d) a parting agent applied to the cover film at a marginal portion thereof between said cover film and said base film, thereby promoting peeling of the cover film relative to the base film.

6. The packaging material according to claim 5, wherein said parting agent is silicon.

* * * * *